(12) United States Patent
Layzell et al.

(10) Patent No.: US 11,406,888 B2
(45) Date of Patent: Aug. 9, 2022

(54) ADDITIVE PRINTING OF AN AIRWAY AND OXYGEN ENHANCEMENT MOUTHPIECE

(71) Applicant: P3 Athletics Inc., Calgary (CA)

(72) Inventors: Paul Bradley Layzell, Calgary (CA); Russell Tanji, Pearl City, HI (US)

(73) Assignee: P3 Athletics Inc., Calgary (CA)

( * ) Notice: Subject to any disclaimer, the term of this patent is extended or adjusted under 35 U.S.C. 154(b) by 416 days.

(21) Appl. No.: 15/474,895

(22) Filed: Mar. 30, 2017

(65) Prior Publication Data
US 2017/0282451 A1 Oct. 5, 2017

Related U.S. Application Data

(60) Provisional application No. 62/315,547, filed on Mar. 30, 2016.

(51) Int. Cl.
| | |
|---|---|
| B33Y 10/00 | (2015.01) |
| A63B 71/08 | (2006.01) |
| B33Y 30/00 | (2015.01) |
| B33Y 50/02 | (2015.01) |
| B33Y 80/00 | (2015.01) |
| B29C 64/106 | (2017.01) |
| B29C 64/386 | (2017.01) |
| B33Y 50/00 | (2015.01) |

(52) U.S. Cl.
CPC .......... *A63B 71/085* (2013.01); *B29C 64/106* (2017.08); *B29C 64/386* (2017.08); *B33Y 10/00* (2014.12); *B33Y 30/00* (2014.12); *B33Y 50/00* (2014.12); *B33Y 50/02* (2014.12); *B33Y 80/00* (2014.12)

(58) Field of Classification Search
CPC ........ A63B 71/085; B33Y 10/00; B29C 64/10
USPC .............................................................. 54/8
See application file for complete search history.

(56) References Cited

U.S. PATENT DOCUMENTS 2,630,117 A * 3/1953 Coleman .............. A63B 71/085
                                                           128/861
4,380,888 A * 4/1983 Lanham .................... A61D 5/00
                                                             433/1

(Continued)

FOREIGN PATENT DOCUMENTS

| EP | 0359135 A1 * | 3/1990 | .......... A63B 71/085 |
| EP | 2 932 935 | 10/2015 | |

(Continued)

OTHER PUBLICATIONS

PCT Application No. PCT/IB2017/001800 International Search Report and Written Opinion dated Jan. 28, 2019.

(Continued)

*Primary Examiner* — Cachet I Proctor
(74) *Attorney, Agent, or Firm* — Polsinelli LLP

(57) ABSTRACT

The present disclosure relates to systems and methods for manufacturing a mouthpiece with desired dimensions or thicknesses that may enhance the performance of an individual when participating in a contact sport. Mouthpieces and methods consistent with the present disclosure may include incremental steps of three dimensional printing that use different materials. Dimensions and materials used when manufacturing mouthpieces of the present disclosure may be optimized according to user preferences or settings.

20 Claims, 11 Drawing Sheets

(56) References Cited

U.S. PATENT DOCUMENTS

| | | | |
|---|---|---|---|
| 5,722,828 A * | 3/1998 | Halstrom | A61C 19/04 433/69 |
| 6,524,101 B1 * | 2/2003 | Phan | A61C 7/00 433/24 |
| 6,591,589 B2 | 7/2003 | Cook | |
| 8,453,650 B1 * | 6/2013 | Frey | A61F 5/56 128/859 |
| 8,585,401 B2 | 11/2013 | Moses | |
| 2005/0103331 A1 * | 5/2005 | Wedemeyer | A61F 5/566 128/200.24 |
| 2008/0015727 A1 * | 1/2008 | Dunne | A61C 11/08 700/118 |
| 2008/0269579 A1 | 10/2008 | Schiebler | |
| 2009/0165805 A1 * | 7/2009 | Syrop | A61F 5/566 128/861 |
| 2009/0186324 A1 | 7/2009 | Penake et al. | |
| 2009/0221884 A1 | 9/2009 | Ryan | |
| 2010/0095970 A1 | 4/2010 | Katz et al. | |
| 2011/0179851 A1 | 7/2011 | Mack et al. | |
| 2011/0209714 A1 | 9/2011 | Makkar et al. | |
| 2011/0270053 A1 * | 11/2011 | Utley | A61B 5/14507 600/309 |
| 2013/0006043 A1 | 1/2013 | Abolfathi et al. | |
| 2013/0209964 A1 * | 8/2013 | Nemeh | A61C 17/005 264/16 |
| 2013/0213412 A1 * | 8/2013 | Moses | A63B 71/085 128/861 |
| 2013/0291874 A1 * | 11/2013 | Engel | A61C 19/063 128/861 |
| 2014/0069441 A1 | 3/2014 | Moses | |
| 2014/0124968 A1 * | 5/2014 | Kim | A61C 7/002 264/16 |
| 2014/0187875 A1 * | 7/2014 | Paris | A61B 5/682 600/595 |
| 2014/0224259 A1 * | 8/2014 | Frey | A61F 5/56 128/848 |
| 2014/0261464 A1 | 9/2014 | Layzell | |
| 2015/0040919 A1 * | 2/2015 | Tolentino | A63B 71/085 128/862 |
| 2015/0245890 A1 | 9/2015 | Wouters et al. | |
| 2015/0328526 A1 | 11/2015 | Schwank et al. | |
| 2015/0360115 A1 * | 12/2015 | Moses | A63B 71/085 128/862 |
| 2016/0001160 A1 * | 1/2016 | Engel | A63B 71/085 128/861 |
| 2016/0128624 A1 * | 5/2016 | Matt | A61B 5/0205 600/301 |
| 2016/0331577 A1 * | 11/2016 | Thornton | B29C 65/562 |
| 2017/0312117 A1 * | 11/2017 | Shah | A61M 16/0069 |
| 2018/0014962 A1 * | 1/2018 | Lee | A61C 5/007 |
| 2018/0021659 A1 | 1/2018 | Layzell | |
| 2018/0118556 A1 | 5/2018 | Layzell | |

FOREIGN PATENT DOCUMENTS

| | | | | |
|---|---|---|---|---|
| EP | | 2932935 A1 * | 10/2015 | A61C 7/08 |
| WO | WO 2010/039025 | | 4/2010 | |
| WO | WO 2015/049321 | | 4/2015 | |
| WO | WO 2015/120271 | | 8/2015 | |
| WO | WO-2015120271 A1 * | | 8/2015 | B33Y 80/00 |
| WO | WO 2015/149127 | | 10/2015 | |
| WO | WO 2018/035478 | | 2/2018 | |
| WO | WO 2019/012306 | | 1/2019 | |

OTHER PUBLICATIONS

U.S. Appl. No. 15/681,085, Paul B. Layzell, PX3 for Horses, filed Aug. 18, 2017.
PCT/US17/47645, PX3 for Horses, Aug. 18, 2017.
PCT Application No. PCT/US2017/047645 International Preliminary Report on Patentability dated Feb. 19, 2019.
U.S. Appl. No. 15/474,920, Paul B. Layzell, Airway and Oxygen Enhancement Mouthpice.
Amazon.com: Under Armourbite Performance Mouthwear Lower Mouthguard: Football Mouth Guards: Sports & Outdoors. (Date of download: Feb. 26, 2016).
Discount Dental DIY, Sleep Tight Mouthpiece Reviews—Does It Work?, Sep. 10, 2015.
Haynes, Stephie; "New Mouthguard provides data for early detection of concussions", SB Nation Bloody Elbow, Jun. 16, 2014.
"Equine Dentistry with Mild Sedation & Power Instruments" (EQUIHEART) Apr. 26, 2016; especially paragraph 1-2 and Top Figure.
PCT Application No. PCT/US2017/047645 International Search Report and Written Opinion dated Jan. 26, 2018.
PCT Application No. PCT/IB2017/001800 International Preliminary Report and Written Opinion dated Jan. 29, 2019.
U.S. Appl. No. 15/474,920 Office Action dated Dec. 7, 2021.

* cited by examiner

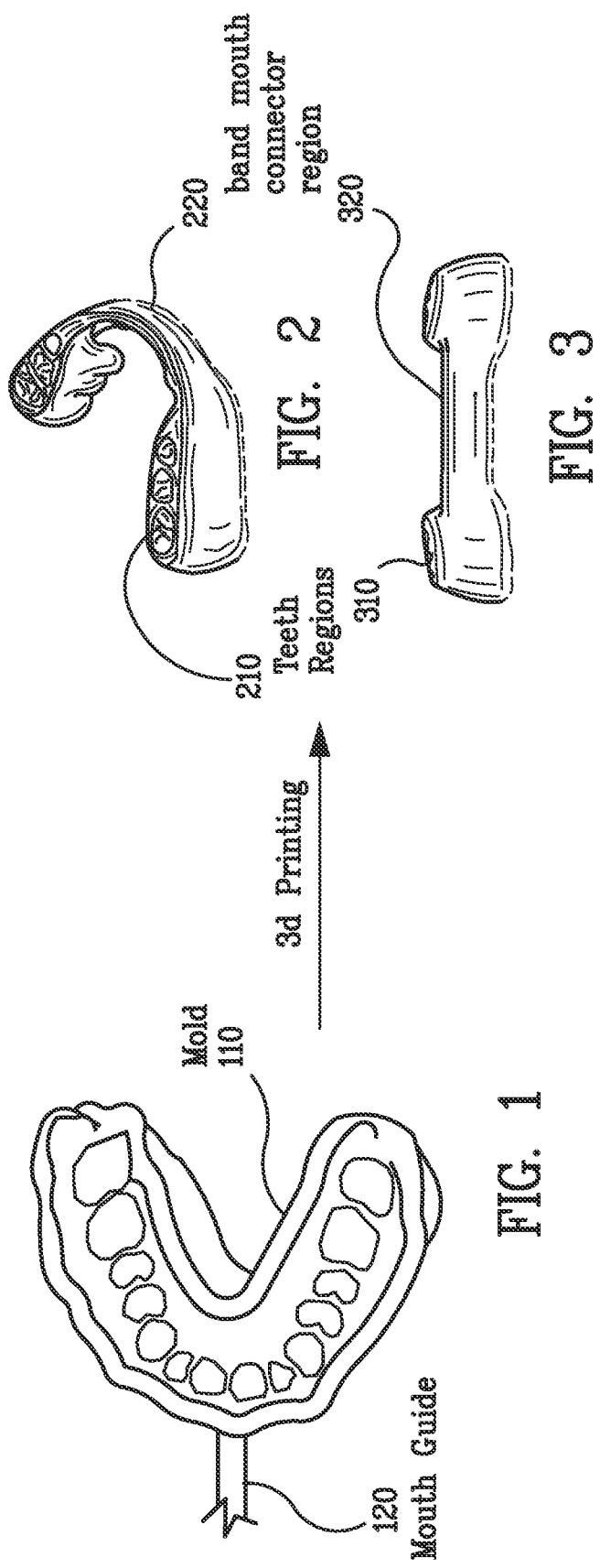

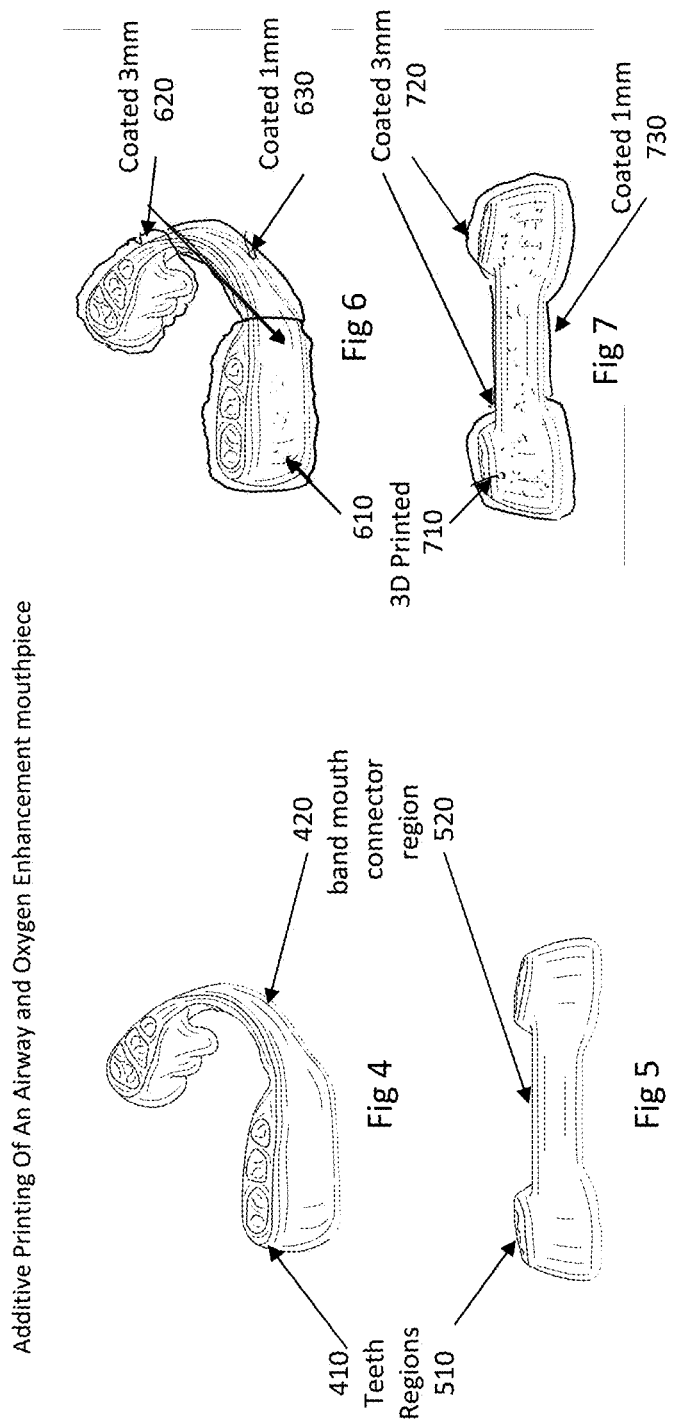

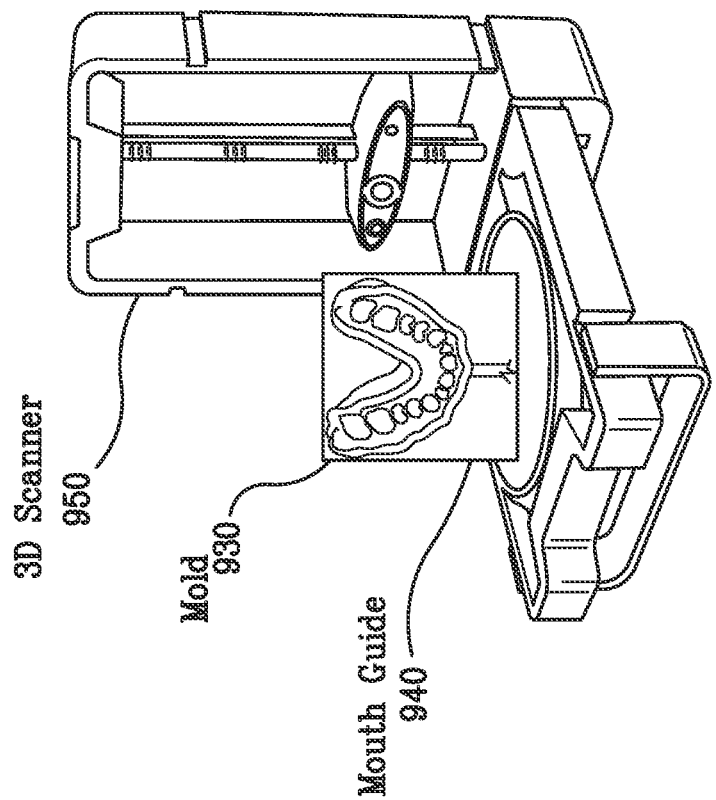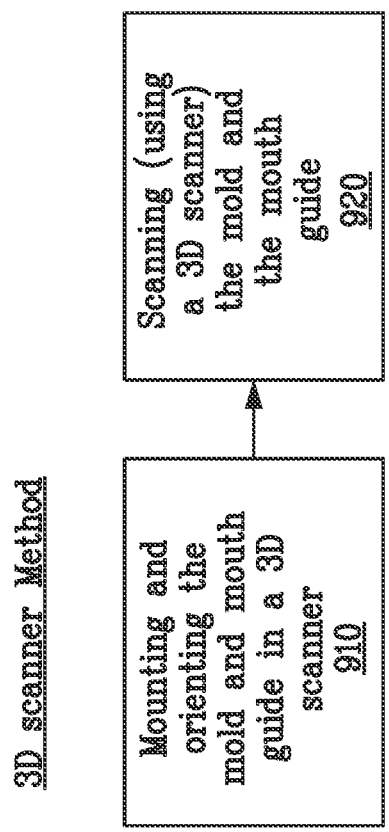
FIG. 9

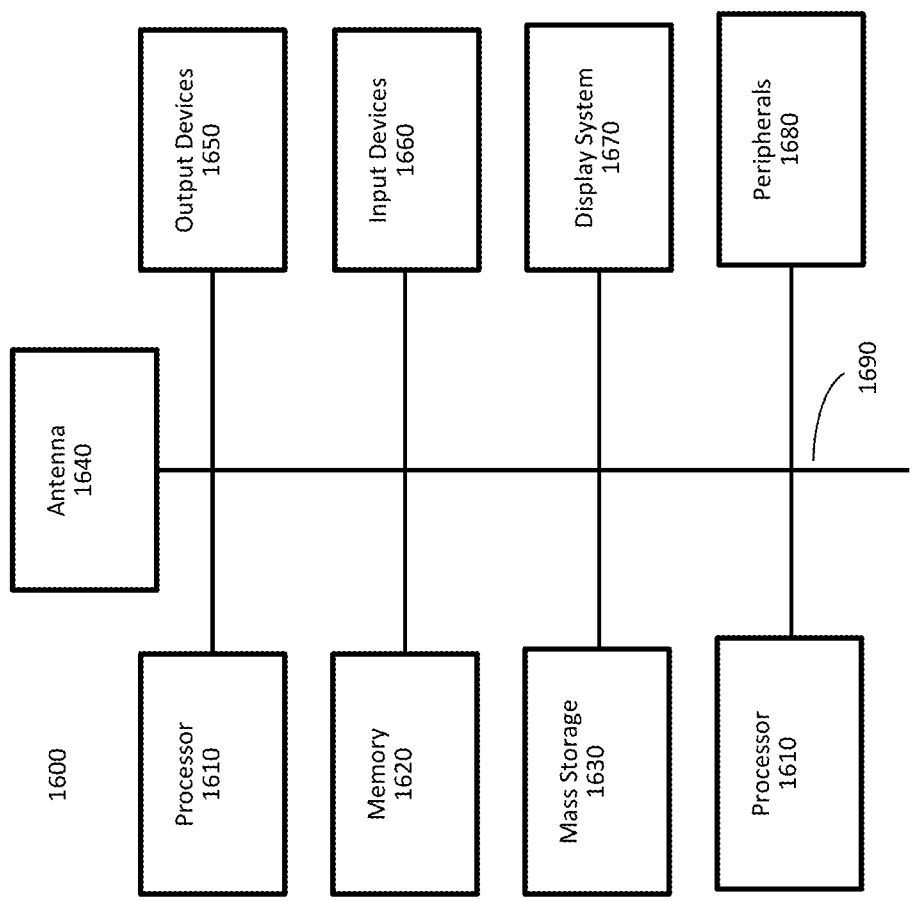

ADDITIVE PRINTING OF AN AIRWAY AND OXYGEN ENHANCEMENT MOUTHPIECE

CROSS-REFERENCE TO RELATED APPLICATIONS

The present application claims the priority benefit of U.S. provisional patent application No. 62/315,547 filed Mar. 30, 2016, the disclosure of which is incorporated herein by reference.

BACKGROUND OF THE INVENTION

Field of the Invention

The present invention is generally related to manufacturing airway and oxygen-enhancing mouthpiece that increases the performance of individuals. More specifically, the present invention is related to customizing the manufacturing of a thermoplastic airway and oxygen-enhancing mouthpieces.

Description of the Related Art

Modern-day individuals participating in contact sports, soldiers, and first responders may wear mouthpieces for teeth and gum protection during high impact or high stress environments. Commonly, these mouthpieces are fabricated from thermoplastics and are form-fitted to one arch of the mouth and have a standard thickness in between the teeth that is either smooth or has a predetermined vertical thickness. Such mouthpieces may further be used by laborers and individuals who perform physically or mentally demanding activities, as well as by individuals recovering from physical or mental injury, jaw disorders, or sleep disorders.

In most cases, during activity, such mouthpieces may significantly restrict the flow of air and oxygen, which may result in increasing fatigue and impairing neurological and physiological functions, as well as increasing risk of injury. Restricting airflow impairs both neurological and physiological function, which increases the risk of injury (e.g., concussion).

Currently, there are not systems or methods that may be used to quickly manufacture mouthpieces with desired dimensions (e.g., optimal vertical opening) that may provide the wearer with increased airway and enhanced blood oxygenation to the brain whether engaged in performing activities, recovery, or sleep. What is needed are improved mouthpiece system where the proper spacing and incisal opening may be identified so as to be able to manufacture mouthpieces that optimize oxygen uptake to the brain and that are otherwise customized to the preferences of the individual user.

SUMMARY OF THE PRESENTLY CLAIMED INVENTION

Embodiments of the presently claimed invention relate to methods, systems, and non-transitory computer readable storage mediums for manufacturing airway and oxygen enhancement mouthpieces quickly and efficiently.

A method of the presently claimed invention may manufacture a mouthpiece for an people to wear when performing activities, recovery, or sleep. The method may include scanning a mold with a three dimensional (3D) scanner of the teeth of the individual, storing image data from the 3D scanner, and modifying the stored image data to include additional dimensional features according to one or more preferences. This modified image data may include an inner portion and an outer portion. The method of the presently claimed invention may also send sending the modified image data to a 3D printer that prints the mouthpiece using a soft thermoplastic material. Such printing may include printing the inner portion with the 3D printer using a first type of material, as well as printing the outer portion with the 3D printer using a second type of material. The outer portion may contact at least part of the inner portion.

A system of the presently claimed invention may include a three dimensional (3D) scanner that scans a mold that include impressions of the teeth of the individual. The system may also include a computer that stores image data from the 3D scanner and modifies the stored image data to include additional dimensional features according to one or more preferences. The modified image data may include an inner portion and an outer portion. The system may also include a 3D printer that receives the modified image data, prints the inner portion with the 3D printer using a first type of material, and that prints the outer portion with the 3D printer using a second type of material, wherein the outer portion contacts at least part of the inner portion.

BRIEF DESCRIPTION OF THE DRAWINGS

FIG. 1 illustrates an airway and oxygen enhancement mouthpiece mold that may be used when fabricating an airway and oxygen enhancement mouthpiece.

FIG. 2 illustrates a mouthpiece in a perspective view.

FIG. 3 illustrates the mouthpiece of FIG. 2 in a side view.

FIG. 4 illustrates a mouthpiece in a perspective view.

FIG. 5 illustrates the mouthpiece of FIG. 3 in a side view.

FIG. 6 depicts a similar perspective view of a mouthpiece as depicted in FIG. 4.

FIG. 7 also depicts a similar view of a mouthpiece as depicted in FIG. 5

FIG. 9 illustrates a three dimensional (3D) scanner method that may be used when fabricating an airway and oxygen enhancement mouthpiece.

FIG. 16 illustrates a block diagram of a computing device that may be used to implement various embodiments of the present invention.

DETAILED DESCRIPTION

Figure 8:
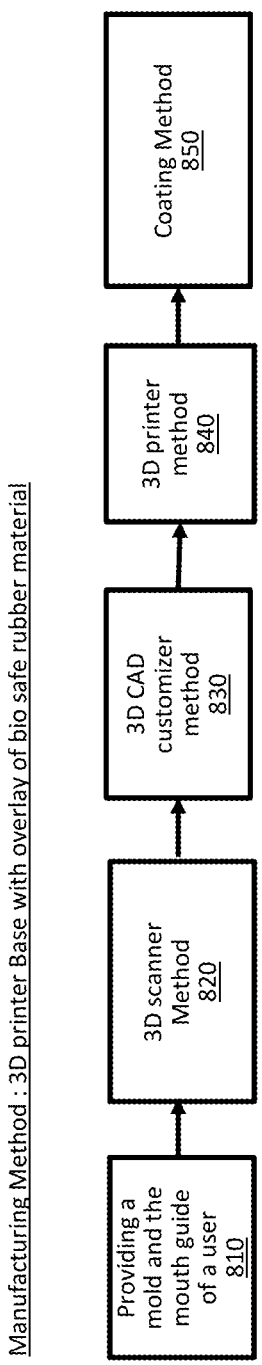
FIG. 8 illustrates an exemplary method for fabricating an airway and oxygen enhancement mouthpiece consistent with the present disclosure.

The present disclosure relates to systems and methods for identifying mouthpiece vertical openings (e.g., different incisal and occlusal openings) that provides an individual with optimal breathing that enhances physiological and neurological performance during activities or rest and recovery. Mouthpieces and methods consistent with the present disclosure may also increase the safety of a sport or other activity by reducing fatigue, stress, and enhancing the volume and circulation of oxygen to the brain.

FIG. 1 illustrates an airway and oxygen enhancement mouthpiece mold that may be used when fabricating an airway and oxygen enhancement mouthpiece. The mold 110 of FIG. 1 includes a mouth guide 120 that may correspond to a band mouth connector region of an airway and oxygen enhancement mouthpiece. The airway and oxygen enhancement mouthpiece mold of FIG. 1 may be used to produce mouthpieces that enhance the ability of an individual to breath while protecting the individual's mouth or teeth from injury.

FIG. 2 illustrates a mouthpiece in a perspective view. FIG. 3 illustrates the mouthpiece of FIG. 2 in a side view. FIGS. 2 and 3 include teeth regions 210/310 of a bite block in the mouthpiece that may have been fabricated at least in part by using a three dimensional (3D) printing process. Recessions that align with the teeth of an individual are shown as tooth shaped recessions 210 in FIG. 2. FIGS. 2 and 3 also include a band mount connector region 220/320 on a front surface of the mouthpiece. This band mount connector region may have a band (not depicted) that may be a plastic band attached to it that attaches to a helmet. Such bands help keep an individual from swallowing or losing the mouthpiece when the individual opens their mouth. The mouthpiece of FIG. 2 and FIG. 3 may be used by an individual when that individual is engaged in a sporting activity, such that the mouthpiece protects the individuals teeth while enhancing the individuals ability to breathe.

FIG. 4 illustrates a mouthpiece in a perspective view, and FIG. 5 illustrates the mouthpiece of FIG. 3 in a side view. FIGS. 4 and 5 include teeth regions of a bite block 410/510 in the mouthpiece. Recessions that align with the teeth of an individual are shown as tooth shaped recessions in FIG. 4. The mouthpiece of FIGS. 4 and 5 may also include a band mount connector region 420/520 on a front surface of the mouthpiece. This band mount connector region 420/520 may have a plastic band (not depicted) attached to it that attaches to a helmet. Such bands help keep an individual from swallowing or losing the mouthpiece during high impact activities. Here again, the mouthpiece of FIG. 4 and FIG. 5 may be used by an individual when that individual is engaged in a sporting activity, such that the mouthpiece protects the individuals teeth while enhancing the individuals ability to breathe.

FIG. 6 depicts a similar perspective view of a mouthpiece as depicted in FIG. 4, and FIG. 7 also depicts a similar view of a mouthpiece as depicted in FIG. 5. FIGS. 6 and 7 include 3D printed regions 610/710 where at least certain portions of the mouthpiece are coated with a 3 mm layer 620/720 and where at least certain other portions are coated with a 1 mm layer 620/720. Note that the 3 mm layer 620/720 corresponds to teeth regions identified in FIGS. 4 and 5. Note also that the 1 mm layer 630/730 corresponds to band mouth connector regions in FIGS. 4 and 5. Such measurements provided above are exemplary and may be modified for different individuals.

The mouthpiece of FIGS. 6 and 7 may also be fabricated entirely using a 3D printing process. As such, the coating layer and the layer that is coated may be fabricated from different materials. Alternatively, the mouthpiece of FIGS. 6 and 7 may be fabricated in party using a 3D printing process. Fabricating a mouthpiece consistent with the present disclosure with different thicknesses of materials in different portions of the mouthpiece allows one region of the mouthpiece to be more resistant to wear than another region. For example, when a region of a mouthpiece is thicker over a portion of the mouthpiece that covers a person's bite region, the mouthpiece will likely last longer. Furthermore, regions of a mouthpiece with a thinner thickness may be more flexible than regions of the mouth piece that are thicker. As such, thinner regions 620/720 may allow a mouthpiece to be more comfortable for a person to wear as compared to a mouthpiece that is overall thicker than a similar mouthpiece that has different thicknesses in different portions of the mouthpiece.

FIG. 8 illustrates an exemplary method for fabricating an airway and oxygen enhancement mouthpiece consistent with the present disclosure. A first step 810 in the method of FIG. 8 provides a mold and a mouth guide that fits a user of an airway and oxygen enhancement mouthpiece. The mold may have been fabricated using a kit supplied to the user. When fabricating the mold, the user may apply mold material to the mouth guide and the user may bite into the mouth guide when forming a mold that conforms to tooth imprints of the user. The mouth guide may help ensure that the position of the mouth guide corresponds to the locations of the user's teeth where a depth of the mold guide positions the teeth of the user at a desired depth.

Step 820 of FIG. 8 is where the mold and the mouth guide may be scanned by a 3D computer aided design (CAD) scanner creating an electronic file that stores a persistent image data of the mold and mouth guide. Next step 830 of FIG. 8, the stored image data may be manipulated or edited. The editing of the stored image data may be according to preferences set by a user or may be according to an automated algorithm that modifies the image data to describe or include features of a mouthpiece that are different from features originally scanned.

Then in step 840 of the method of FIG. 8, the 3D CAD image may be loaded into a 3D printer and a mouthpiece base may be printed using the 3D printer. Finally, in step 850 of FIG. 8, the 3D printed mouthpiece may be coated. Such a coating may be of a material that is a bio-safe rugged rubbery material. In certain instances the 3D mouthpiece base may be of a different material as compared to the coating. The process of FIG. 8 produces an airway and oxygen enhancement mouthpiece that fits the user and that is fabricated according to 3D image data stored in a file.

FIG. 9 illustrates a three dimensional (3D) scanner method that may be used when fabricating an airway and oxygen enhancement mouthpiece. FIG. 9 also illustrates an exemplary mold 930, mouth guide 940, and an exemplary 3D scanner 950. In step 910 of FIG. 9, a mold 930 of mouth guide 940 may be oriented when preparing to scan the mold and mouth guide by 3D scanner 950. In step 920 of FIG. 9 the mold 930 and mouth guide 940 may be scanned by the 3D printer 950. As mentioned above, scanned image data may be stored in a file for use in the future.

Figure 10:
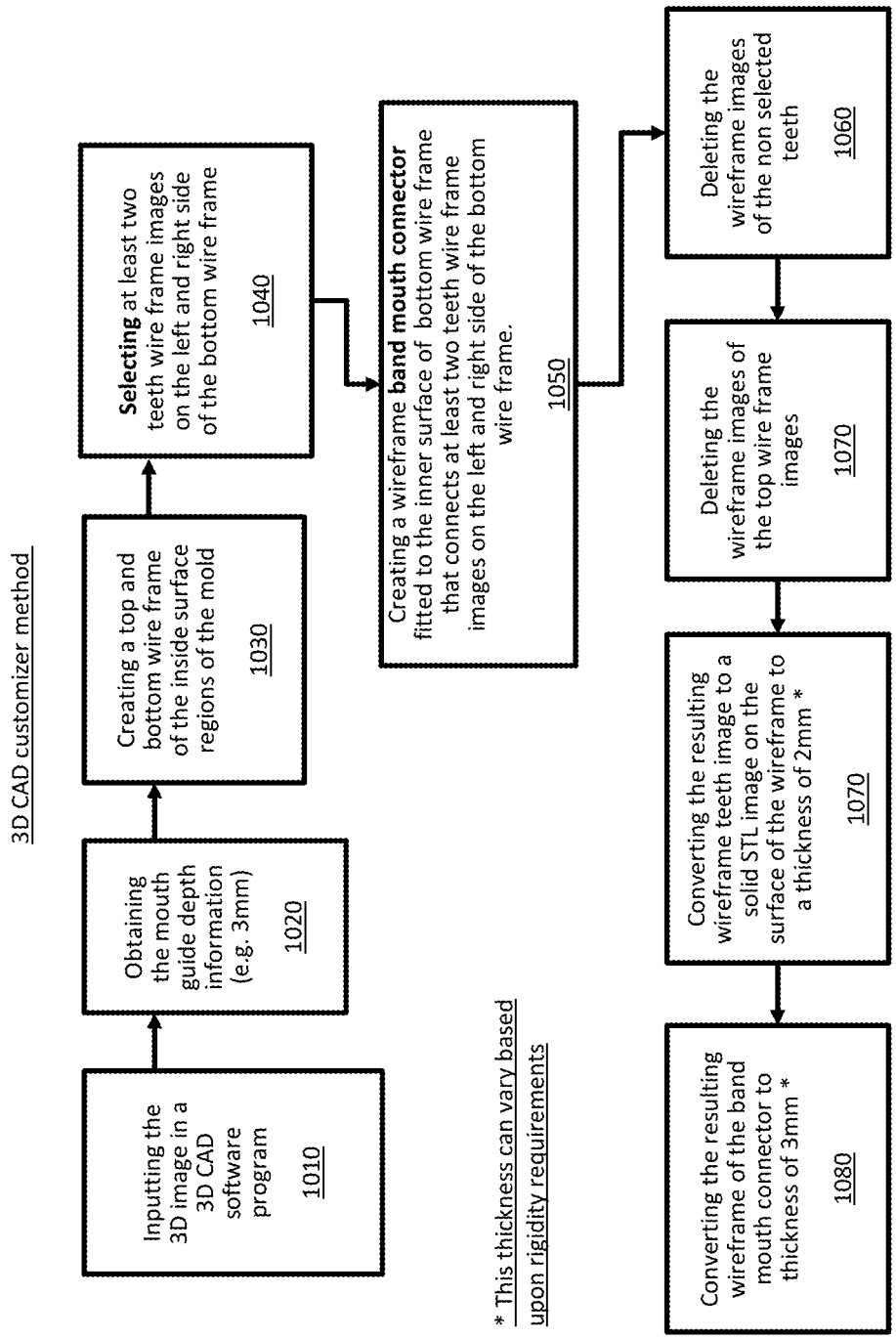
FIG. 10 illustrates an exemplary method for customizing scanned image data when preparing to produce mouthpieces with specific dimensional characteristics.

FIG. 10 illustrates an exemplary method for customizing scanned image data when preparing to produce mouthpieces with specific dimensional characteristics. Step 1010 of FIG. 10 is where image data from a stored file (e.g., data from a previously scanned mold and mouth guide) may be loaded into a 3D CAD program. Next, step 1020 of FIG. 10, mold guide depth information may be obtained. This depth information may correspond to a thickness of a mouth guide that may yield a desired incisal opening in the mouth of a user when the user wears a mouthpiece consistent with the present disclosure. For example, the depth information may correspond to an incisal opening of 3 millimeters (mm). Such measurements provided above are exemplary and may be modified for different individuals. Occlusal spacing for molars may range from 0 mm to 12 mm, while front incisal opening gaps may range from 0.5 mm to 12 mm.

Step 1030 of FIG. 10 is where a top and a bottom wire frame of the inside surface regions of the mold may be created. This third step may also include creating wire frames on the sides of the mold and may include creating multiple sets of such wire frames. Step 1040 of FIG. 10 includes selecting at least two sets of the multiple sets of wire frames created in step 3 of FIG. 10.

Next, in step 1050 of FIG. 10, a wireframe band mouth connector may be created that conforms to each respective set of wireframes selected in step four. These wireframes may also correspond to features on a user's teeth to which the user's teeth may contact when the user is wearing a mouthpiece fabricated by methods consistent with the present disclosure. Step 1060 of FIG. 10 is where wireframe images that may have been created in step three of FIG. 10 that were not selected in step 1040 may be deleted. Next in step 1070 of FIG. 10 wireframe images of a top wireframe may be deleted.

Step 1080 of FIG. 10 is where any resulting selected wireframes may be used when creating a solid simple direct media layer (STL) image to a desired thickness (e.g. 2 mm) on the surface of the wireframe. Finally, in step 1090 of FIG. 10, the resulting wireframe may be converted into a resulting wireframe band mouth connector with a thickness of 3 mm. Such measurements provided above are exemplary and may be modified for different individuals.

Figure 11:
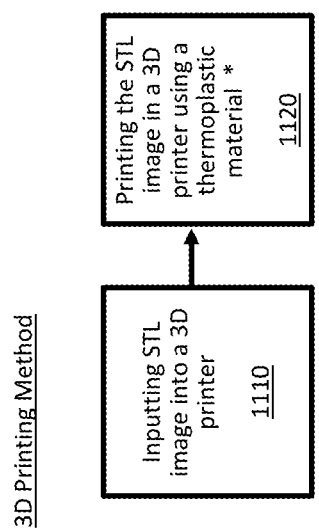
FIG. 11 illustrates an exemplary three dimensional (3D) printing method consistent with the present disclosure.

FIG. 11 illustrates an exemplary three dimensional (3D) printing method consistent with the present disclosure. FIG. 11 begins with step 1110 where an STL image (i.e. image data) is input into a 3D printer. Next, in step 1120 of FIG. 11, the STL image is printed, the printing of the STL image may be printed using a thermoplastic material.

Figure 12:
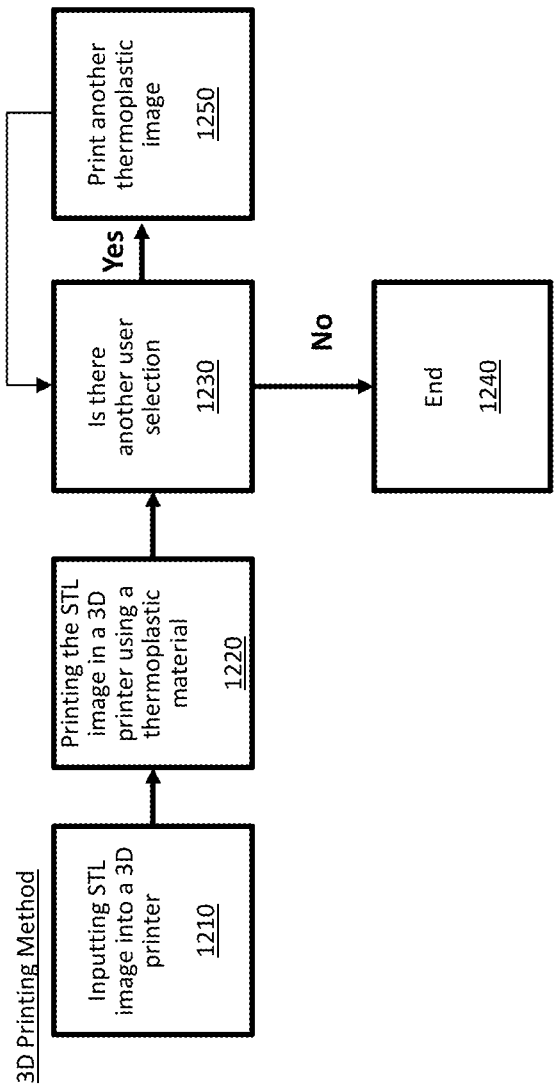
FIG. 12 illustrates an exemplary three dimensional (3D) printing method consistent with the present disclosure.

FIG. 12 illustrates an exemplary three dimensional (3D) printing method consistent with the present disclosure. FIG. 12 begins with step 1210 where an STL image (i.e. image data) is input into a 3D printer. Next, in step 1220 of FIG. 11, the STL image is printed, the printing of the STL image may be printed using a soft thermoplastic material. Step 1230 of FIG. 12 identifies whether another STL image file has been selected and not printed. When determination step 1230 identifies that there is not another image file to send to the 3D printer, the flowchart of FIG. 11 ends in step 1240 of FIG. 12. When determination step 1230 identifies that there is another STL image file to print, the flow chart moves to step 1250 of FIG. 12 where another thermoplastic image is printed. The method of FIG. 12 may move between steps 1230 and 1250 until each selected STL image file is printed into a soft thermoplastic structure.

Figure 13:
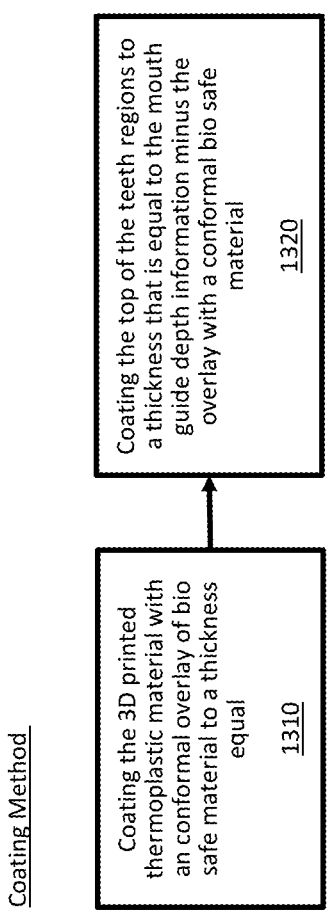
FIG. 13 illustrates an exemplary coating method consistent with the present disclosure.

FIG. 13 illustrates an exemplary coating method consistent with the present disclosure. FIG. 13 includes step 1310 where a previously manufactured thermoplastic material is coated with a conformal overlay of bio-safe materials of a uniform thickness, when desired. Next, in step 1320 of FIG. 13, a top region of the teeth regions may be coated with an additional thickness of conformal bio-safe material, when required.

Figure 14:
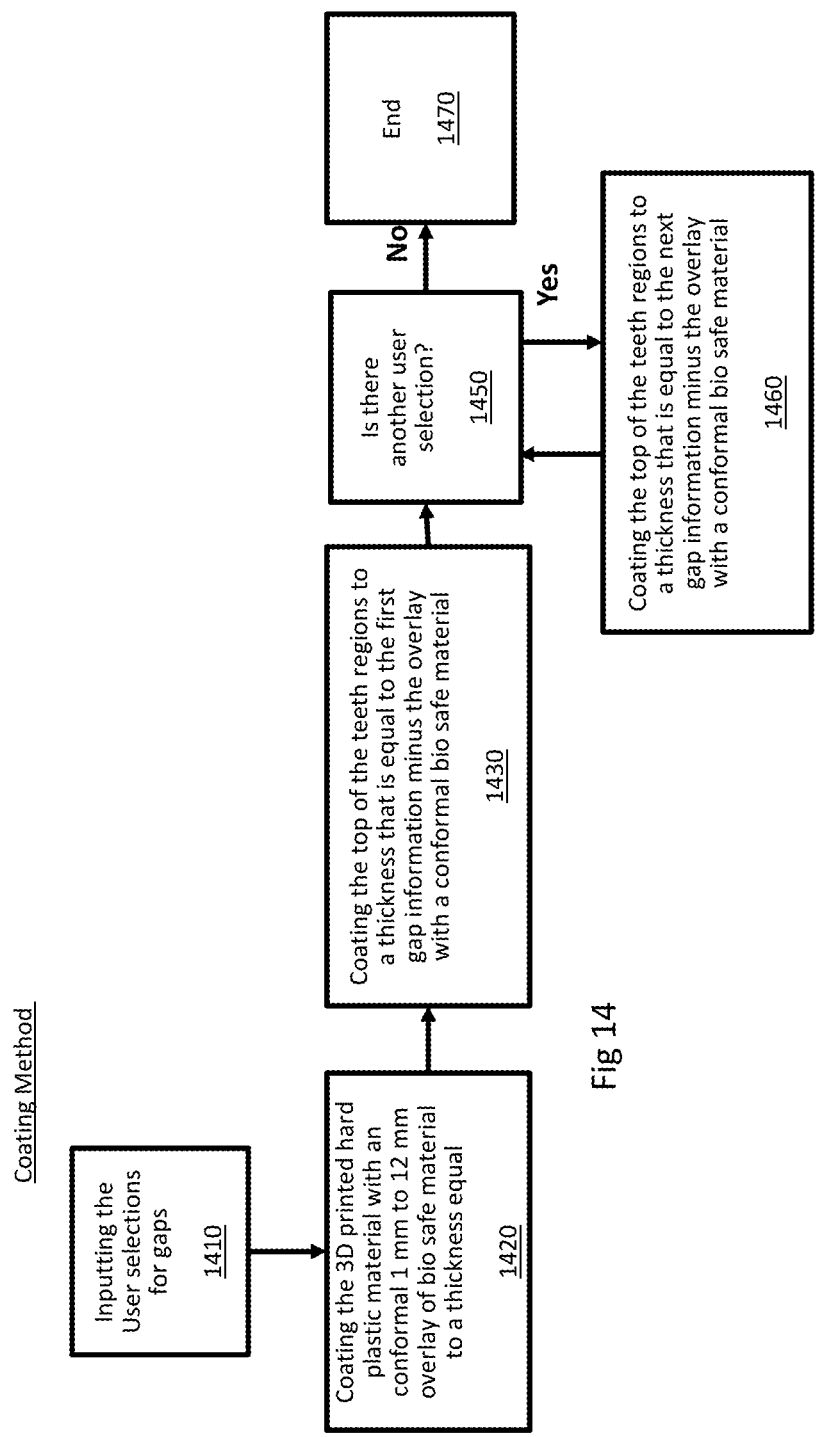
FIG. 14 illustrates an exemplary coating method consistent with the present disclosure.

FIG. 14 illustrates an exemplary coating method consistent with the present disclosure. Step 1410 of FIG. 14 is a step that receives user selections of gaps that may correspond to an incisal gap or a thickness of a final mouthpiece. Next, in step 1420 of FIG. 14, a previously produced (3D printed) 3D thermoplastic material may be coated with a thickness of bio-safe material (e.g. a 1 mm thickness). Bio-safe materials that may be used include, yet are not limited to ethylene-vinyl acetate.

Then, in step 1430 of FIG. 14, top teeth regions of the mouthpiece being fabricated may be coated with desired thickness of bio-safe material. When an overall thickness of coating on these top teeth regions is 3 mm, an additional 2 mm may be added to the previous 1 mm coating added in step two of FIG. 11 (e.g., 3 mm−1 mm=2 mm). As noted previously, such measurements provided above are exemplary and may be modified for different individuals.

Next, step 1440 of FIG. 14 identifies whether another mouthpiece selection should be coated. If not, the flow chart of FIG. 14 moves to step 1460 where the flow chart ends. When a next mouthpiece should be coated, the flow chart moves from step 1440 to step 1450 where the next mouth piece is coated. The flow chart of FIG. 14 may move from step 1460 to step 1450 until all selected mouthpieces are coated.

This coating method, when used, may use materials like ethylene-vinyl acetate which is the most popular mouth guard material used by both amateurs and semi-professional sportsmen. The coating method coats the 3D printed thermoplastic material with a conformal 1 mm to 12 mm overlay of bio-safe material to a desired thickness. The coating example of ethylene vinyl acetate can be done with a surface preparation such as plasma cleaning (a dry, solvent free technology used to precision clean surfaces, plasma precision cleaning is a conformal process, not only for substrates of complex geometries but also on textured surfaces with topographies). The chemically activating material surface to work with the adhesive to ethylene vinyl acetate, which is a thermoplastic that responds well to gas plasma treatment. The ethylene-vinyl acetate may be coated by any number of processes, from dip coating to chemical vapor deposition to spray coating etc. In order to have different thicknesses in one region (connector to another region (top of the teeth regions) the different regions could all be coated to the larger thickness and the larger thickness is masked (tape, etc.) and the thinner regions are created through controlled wet etching or dry etching. The reverse is true, where all regions are coated to the minimum thickness and the thinner regions are masked and the larger regions are coated by any number of processes, from dip coating to chemical vapor deposition to spray coating etc. The coating method coats the top of the teeth regions to a thickness that is equal to the mouth guide depth information minus the 1 mm overlay with a conformal bio-safe material.

Figure 15:
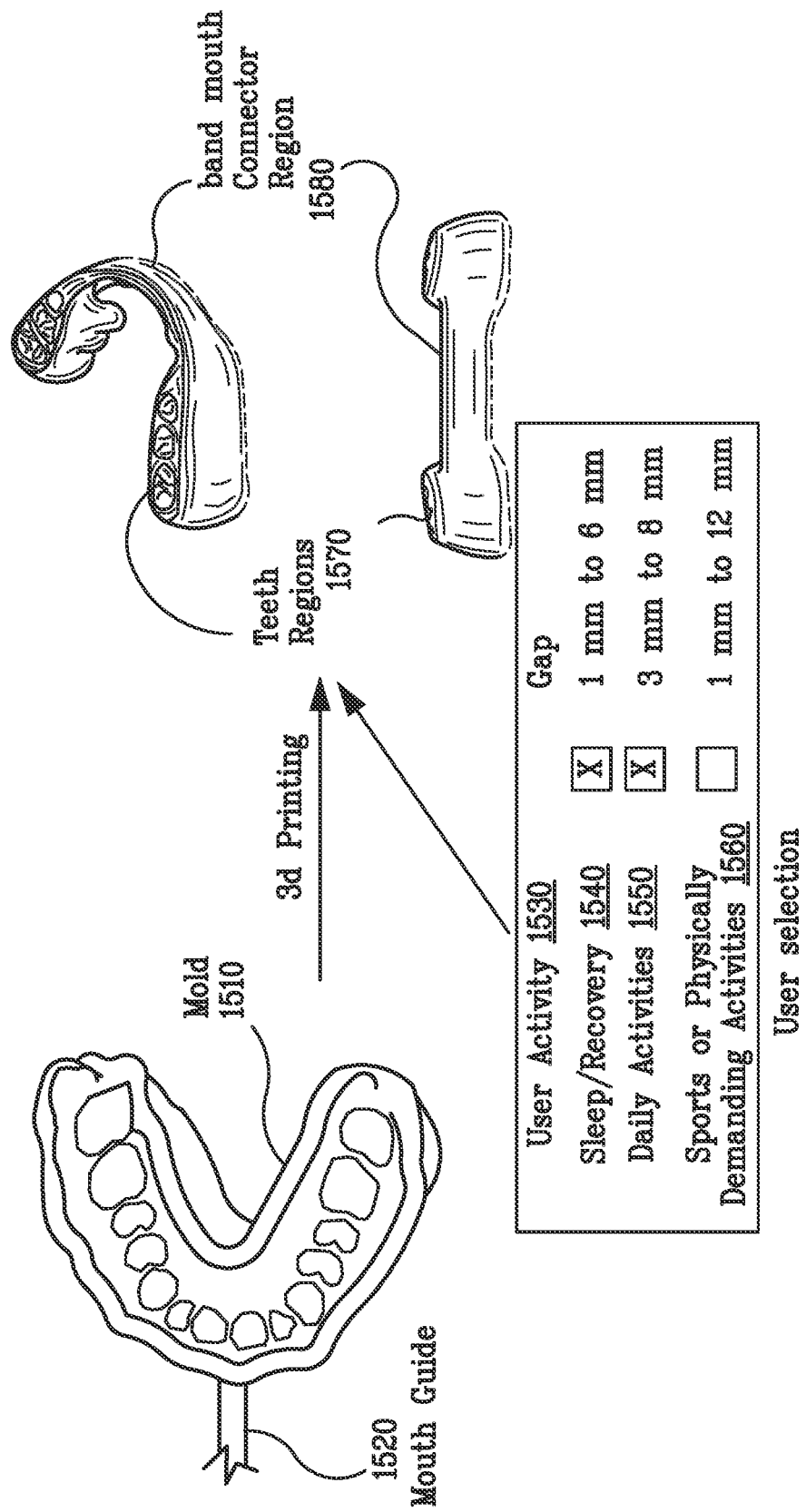
FIG. 15 illustrates a mold, mouth guide, and a bite block that includes similar features as those included in FIGS. 1-3.

FIG. 15 illustrates a mold, mouth guide, and a bite block that includes similar features as those included in FIGS. 1-3. The mold 1520 may be scanned when creating image files that can be provided to a 3D printer when mouthpieces consistent with the present disclosure are fabricated. In such instances, mouth guide 1520 may also be included in a feature of a 3D printed mouthpiece. FIG. 15 includes user 1530 selections not depicted in FIGS. 1-3. The user selections 1530 of FIG. 15 include user activities of sleep/recovery 1540, daily activities 1550 (e.g., that are not physically demanding), and physically demanding activities 1560. Note that a gap associated with sleep selection 1540 is 1 mm to 6 mm and that a gap associated with daily activities selection 1550 is 3 mm to 8 mm. Such measurements provided above are exemplary and may be modified for different individuals.

As such, the user selections of FIG. 15 may be modified in a graphical user interface (GUI) by a user wishing to fabricate mouthpieces with different spacing gaps that may vary according to user activity preferences. Each respective mouthpiece may be fabricated with an incremental spacing gap according to user preferences that may be set in a GUI.

As such, the present disclosure is not limited to mouthpieces made for contact sports, night splints, bruxism devices, or sleep aids. Here again, mouthpieces may include teeth regions 1570 and band mouth connector region 1580.

FIG. 16 is a block diagram of a device for implementing the present technology. FIG. 16 illustrates an exemplary computing system 1600 that may be used to implement a computing device for use with the present technology. System 1600 of FIG. 16 may be implemented in the contexts of the likes of clients and servers. The computing system 1600 of FIG. 16 includes one or more processors 1610 and memory 1620. Main memory 1620 may store, in part, instructions and data for execution by processor 1610. Main memory 1620 can store the executable code when in operation. The system 1600 of FIG. 16 further includes mass storage 1630, which may include resident mass storage and portable storage, antenna 1640, output devices 1650, user input devices 1660, a display system 1670, and peripheral devices 1680.

The components shown in FIG. 16 are depicted as being connected via a single bus 1690. However, the components may be connected through one or more data transport means. For example, processor unit 1610 and main memory 1620 may be connected via a local microprocessor bus, and the storage 1630, peripheral device(s) 1680, and display system 1670 may be connected via one or more input/output (I/O) buses.

Mass storage device 1630, which may include mass storage implemented with a magnetic disk drive or an optical disk drive, or be a portable storage device. Mass storage device 1630 can store the system software for implementing embodiments of the present invention for purposes of loading that software into main memory 1620.

In certain instances mass storage 1630 may include a portable storage device, such as a floppy disk, compact disk, a Digital video disc, or a USB data storage device. The system software for implementing embodiments of the present invention may be stored on such a portable medium and input to the computer system 1600 via the portable storage device.

Antenna 1640 may include one or more antennas for communicating wirelessly with another device. Antenna 1640 may be used, for example, to communicate wirelessly via Wi-Fi, Bluetooth, with a cellular network, or with other wireless protocols and systems. The one or more antennas may be controlled by a processor 1610, which may include a controller, to transmit and receive wireless signals. For example, processor 1610 executes programs stored in memory 1620 to control antenna 1640 transmit a wireless signal to a cellular network and receive a wireless signal from a cellular network.

The system 1600 as shown in FIG. 16 includes output devices 1650 and input devices 1660. Examples of suitable output devices include speakers, printers, network interfaces, and monitors. Input devices 1660 may include a touch screen, microphone, accelerometers, a camera, and other devices. Input devices 1660 may also include an alpha-numeric keypad, such as a keyboard, for inputting alpha-numeric and other information, or a pointing device, such as a mouse, a trackball, stylus, or cursor direction keys.

Display system 1670 may include a liquid crystal display (LCD), LED display, a plasma display, or be another suitable display device. Display system 1670 receives textual and graphical information, and processes the information for output to the display device.

Peripherals 1680 may include any type of computer support device to add additional functionality to the computer system. For example, peripheral device(s) 1680 may include a modem or a router.

The components contained in the computer system 1600 of FIG. 16 are those typically found in computing system, such as but not limited to a desktop computer, laptop computer, notebook computer, netbook computer, tablet computer, smart phone, personal data assistant (PDA), or other computer that may be suitable for use with embodiments of the present invention and are intended to represent a broad category of such computer components that are well known in the art. Thus, the computer system 1600 of FIG. 16 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description is not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for manufacturing a custom mouthpiece, the method comprising:
   receiving image data from a three-dimensional (3D) scanner, wherein the image data includes impressions of teeth of a user;
   generating a plurality of wireframe images that correspond to the teeth impressions of the image data;
   identifying one or more thicknesses for different regions of the custom mouthpiece based on one or more selected spacing gaps including an occlusal spacing gap;
   selecting a first and a second wireframe image from the plurality of wireframe images based on the identified thicknesses;
   modifying at least one dimensional feature of a 3D printer image file to conform the selected first and second selected wireframe images to the identified thicknesses corresponding to the selected spacing gaps including the occlusal spacing gap, and the modified 3D printer image file pertaining to at least one of a customized inner portion and a customized outer portion of the custom mouthpiece;
   sending the modified 3D printer image file to a 3D printer;
   printing the customized inner portion with the 3D printer based on the modified 3D printer image file using a first type of material; and
   printing the customized outer portion with the 3D printer based on the modified 3D printer image file using a second type of material, wherein the customized outer portion contacts at least part of the customized inner portion in accordance with the selected spacing gaps including the occlusal spacing gap during wear by the user.

2. The method of claim 1, further comprising scanning a mold with the 3D scanner to obtain the image data, wherein the mold includes the impressions of the teeth of the user.

3. The method of claim 1, wherein the identified thicknesses include one or more different thicknesses for the different regions of the custom mouthpiece to be printed via the 3D printer.

4. The method of claim 3, wherein one of the regions of the custom mouthpiece is printed via the 3D printer to be thicker than at least one other of the regions of the custom mouthpiece based on the different thicknesses.

5. The method of claim 1, wherein the second type of material comprises Ethylene-vinyl acetate.

6. The method of claim 1, further comprising coating at least one of the custom mouthpiece.

7. The method of claim 6, wherein the coating comprises Ethylene-vinyl acetate.

8. The method of claim 6, wherein coating the at least one region comprises at least one of a dip coating process, a vapor deposition process, or a spray coating process.

9. The method of claim 6, further comprising masking at least one other of the regions of the custom mouthpiece before the at least one region of the custom mouthpiece is coated.

10. The method of claim 1, further comprising storing the modified 3D printer image file in memory.

11. A system for manufacturing a custom mouthpiece, the system comprising:
a three-dimensional (3D) scanner that provides image data that includes impressions of teeth of a user;
a computer that:
generates a plurality of wireframe images that correspond to the teeth impressions of the image data,
identifies one or more thicknesses for different regions of the custom mouthpiece based on one or more selected spacing gaps including an occlusal spacing gap,
selects a first and a second wireframe image from the plurality of wireframe images based on the identified thicknesses, and
modifies at least one dimensional feature of the 3D printer image file to conform the selected first and second wireframe images to the identified thicknesses corresponding to the selected spacing gaps including the occlusal spacing gap, and the modified 3D printer image file pertaining to at least one of a customized inner portion and a customized outer portion of the custom mouthpiece; and
a 3D printer that:
receives the modified 3D printer image file from the computer,
prints the customized inner portion with the 3D printer based on the modified 3D printer image file using a first type of material, and
prints the customized outer portion with the 3D printer based on the modified 3D printer image file using a second type of material, wherein the customized outer portion contacts at least part of the customized inner portion in accordance with the selected spacing gaps including the occlusal spacing gap during wear by the user.

12. The system of claim 11, wherein the 3D scanner scans a mold that includes impressions of the teeth of the user to obtain the image data.

13. The system of claim 11, wherein the identified thicknesses include one or more different thicknesses for the different regions of the custom mouthpiece to be printed via the 3D printer.

14. The system of claim 13, wherein one of the regions of the custom mouthpiece is printed via the 3D printer to be thicker than at least one other of the regions of the custom mouthpiece based on the different thicknesses.

15. The system of claim 11, wherein the second type of material comprises Ethylene-vinyl acetate.

16. The system of claim 11, wherein at least one region of the custom mouthpiece is coated.

17. The system of claim 16, wherein the coating comprises Ethylene-vinyl acetate.

18. The system of claim 16, wherein the coating occurs via at least one of a dip coating process, a vapor deposition process, or a spray coating process.

19. The system of claim 16, wherein at least one other of the regions of the custom mouthpiece is masked before the at least one region of the custom mouthpiece is coated.

20. The system of claim 11, wherein the computer comprises memory that stores the modified 3D printer image file in memory.

* * * * *